United States Patent [19]

Becerra-Novoa et al.

[11] Patent Number: 5,296,015
[45] Date of Patent: Mar. 22, 1994

[54] METHOD FOR THE PNEUMATIC TRANSPORT OF LARGE IRON-BEARING PARTICLES

[75] Inventors: Jorge O. Becerra-Novoa, Apodaca; Ricardo Viramontes-Brown, Garza Garcia; Marco A. Flores-Verdugo, Monterrey; Jose J. Garza-Ondarza, San Nicolás de los Garza, all of Mexico

[73] Assignee: Hylsa S.A. de C.V., Monterrey, Mexico

[21] Appl. No.: 526,189

[22] Filed: May 18, 1990

[30] Foreign Application Priority Data

Jan. 9, 1990 [MX] Mexico .................................. 19059

[51] Int. Cl.$^5$ ...................... C21B 13/00; C21B 13/12
[52] U.S. Cl. ...................................... 75/10.66; 75/433; 75/488; 406/197
[58] Field of Search ............ 75/10.63, 10.66, 488–498, 75/537, 433; 266/182, 160; 406/197

[56] References Cited

U.S. PATENT DOCUMENTS

| 2,540,593 | 2/1951 | Ogorzaly . | |
|---|---|---|---|
| 2,670,946 | 3/1954 | Royster . | |
| 2,816,803 | 12/1957 | Clark et al. . | |
| 2,841,446 | 7/1958 | Trotter . | |
| 3,375,099 | 3/1968 | Marshall . | |
| 3,537,755 | 11/1970 | Schmidt . | |
| 3,710,808 | 1/1973 | Celada et al. . | |
| 3,765,872 | 10/1973 | Celada et al. . | |
| 3,799,367 | 3/1974 | Grewer . | |
| 3,936,296 | 2/1976 | Campbell . | |
| 4,007,034 | 2/1977 | Hartwig . | |
| 4,008,074 | 2/1977 | Rossner et al. | 75/532 |
| 4,032,120 | 6/1977 | Beggs . | |
| 4,045,214 | 9/1977 | Wetzel et al. . | |
| 4,046,557 | 9/1977 | Beggs . | |
| 4,072,504 | 2/1978 | Perdahl et al. . | |
| 4,129,289 | 12/1978 | Miyasita et al. . | |
| 4,150,972 | 4/1979 | Price-Falcon et al. . | |
| 4,169,533 | 10/1979 | Rubio | 75/433 |
| 4,188,022 | 2/1980 | Beggs et al. . | |
| 4,280,840 | 7/1981 | Swiecicki . | |
| 4,412,858 | 11/1983 | Viramontes-Brown et al. . | |
| 4,427,135 | 1/1984 | MacKay et al. . | |
| 4,427,136 | 1/1984 | MacKay et al. . | |
| 4,437,796 | 3/1984 | Ulveling et al. | 266/176 |
| 4,448,402 | 5/1984 | Weber et al. | 75/492 |
| 4,498,498 | 2/1985 | Martinez-Vera et al. . | |
| 4,528,030 | 7/1985 | Martinez-Vera et al. . | |
| 4,592,679 | 6/1986 | Boiting et al. . | |
| 4,630,975 | 12/1986 | Becker . | |
| 4,685,964 | 8/1987 | Summers et al. . | |
| 4,780,028 | 10/1988 | McLemore . | |
| 4,784,689 | 11/1988 | Vuletic . | |
| 4,886,246 | 12/1989 | Maeda et al. | 266/160 |
| 4,889,323 | 12/1989 | Pusch et al. | 266/160 |

FOREIGN PATENT DOCUMENTS

| 3201608 | 9/1982 | Fed. Rep. of Germany | 266/182 |
|---|---|---|---|
| 3806861C1 | 3/1988 | Fed. Rep. of Germany . | |
| 113110 | 6/1984 | Japan . | |

Primary Examiner—Melvyn J. Andrews
Attorney, Agent, or Firm—A. Thomas S. Safford

[57] ABSTRACT

In a method of producing iron and steel, from iron ores largely composed of iron oxides, wherein a direct reduction process is used to produce a solid particulate intermediate product, generally known as sponge iron or Direct Reduced Iron (DRI); pneumatically conveying the DRI in a closed pipe from the reduction reactor of the direct reduction process to the metallurgical furnaces where liquid iron or steel are produced, for example electric arc furnaces, induction furnaces, basic oxygen furnaces, etc. or to a briquetting press to form DRI briquettes, or simply to a silo or storage bin, or in general to a subsequent processing step for said DRI. When the carrier gas is recirculated for reuse, surprisingly air is preferred as the source of such gas, especially for reactive hot DRI. This method has a superior efficiency and productivity and reduces the overall energy consumption relative to currently used DRI steelmaking plants. This is also applicable to pneumatic delivery of cold (or hot) ore to the reduction reactor.

40 Claims, 6 Drawing Sheets

METHOD FOR THE PNEUMATIC TRANSPORT OF LARGE IRON-BEARING PARTICLES

FIELD OF THE INVENTION

The present invention relates to a method applicable in the production of iron and steel, wherein a direct reduction process is employed to produce an intermediate product in the form of a particulate solid, commonly known as sponge iron or Direct Reduced Iron (DRI). More particularly, the invention is characterized by the produced DRI (at least 90% of which is preferably larger than 5 mm) being pneumatically transported from the reduction reactor of said direct reduction process to a remote location for subsequent storage or processing, e.g. preferably to melting metallurgical furnaces to produce liquid iron and steel.

BACKGROUND OF THE INVENTION

In the recent years, the necessity of rendering the steelmaking processes more efficient, more productive, and less wasteful, has become increasingly urgent, due to rising production costs (particularly energy costs) and also due to the increasing restrictions imposed upon steel plants for ecological reasons.

One of the successful routes for producing steel, which is being increasingly promoted and has become more widely utilized, is the direct reduction without melting of lumps or pellets of ore with subsequent electric arc furnace refining. This is in contrast to the traditional steel plants using blast furnaces and basic oxygen converter furnaces for making steel from melted ore. Although in the present specification a preferred embodiment of the invention is described as applied to a steelmaking plant comprising a direct reduction plant and electric arc furnaces, it is evident that the invention in its broader aspects can be adapted to other applications where DRI or other metallic iron bearing particles (hot or cold) are to be transported.

In order to better understand the invention, some of the characteristics of DRI are given herein, which will help one to appreciate why pneumatic transport systems had never been previously recommended for commercialized DRI nor ever successfully used before with this material.

DRI is commercially produced by direct reduction of lumps or pellets of iron ore by contacting these with a stream of reducing gas at a high temperature. Reduction is carried out in the solid state. The resulting DRI is a friable particulate solid which is very porous and reactive at high temperatures. At such elevated temperatures, it reoxidizes exothermically with water or oxygen in the ambient air.

Iron ores employed for direct reduction are generally iron oxides: hematite and magnetite. When the iron ore has a high iron content, for example above 55%, it can be economically processed by simply breaking it down to particle sizes at least 80% and preferably at least 90% of which are greater than 0.5 cm and range up to about 6 cm (i.e. 0.2 to 2.4 inches). It is also necessary that said ore has a high mechanical strength so as to withstand pressures, shocks and crushing which tend to create undesirable and excessive fines during its transport and handling. Such dust-like fines can cause considerable problems, such as uneven flow and gas channelling inside the fixed or moving bed reduction reactor. This results in unhomogeneous reduction, thus producing DRI of an inferior and uneven quality.

In order to render it mechanically stronger, it is preferred in many cases, to grind the iron ore, magnetically concentrate it to increase its iron content, include some additives such as lime and dolomite, and form it into pellets in the 0.5 to 2.4 cm range. In this pelletizing process, the pellets formed are generally spherical with the desired chemical composition needed for optimal performance in the reduction process and also in the subsequent steelmaking stage in the electric arc furnace. Since pellets have a higher iron content with a more uniform quality, they can consequently be transported over long distances by truck, rail, etc., more economically (because the unnecessary transportation of a substantial amount of gangue is avoided).

Direct reduction plants chemically reduce iron ores by contacting the particles, which may be irregularly shaped pieces of iron ore or pellets or mixtures thereof, with a stream of reducing gas, largely composed of hydrogen and carbon monoxide, at a temperature between 850° and 1,050° C., normally at about 950° C.

The commercial reduction reactor may be of the fixed bed or moving bed type. It is evident that in order to increase the reaction rate between the solid ore particles and the reducing gas, it is desirable that said particles be highly porous. However, this characteristic also makes DRI very reactive, since it contains a high proportion of metallic iron, which tends to reoxidize when in contact with the oxygen in air or water. As is typical of all chemical reactions, reoxidation of DRI is faster and more violent as the temperature increases. This is why DRI in the past always has most desirably been safely handled at ambient temperature and is normally cooled down inside the reduction reactor by circulating a cooling gas therethrough before it is discharged. See, for example, U.S. Pat. Nos. 3,765,872; 4,046,557; and 4,150,972.

Cooling DRI, although commonly necessary for the safe handling of the DRI to avoid reoxidation problems and to reduce the need for expensive temperature resistent pumps, valves, etc., is however disadvantageous with respect to the energy efficiency of the overall steelmaking process. Since much of the thermal energy of the DRI is lost through its cooling; therefore, it is necessary to spend more energy to heat the DRI once again in order to melt it and convert it to steel. Only some of the lost energy is usefully recovered in steam generation, in heat exchangers, and the like.

To meet this problem, it has been proposed in the past to omit cooling the DRI in the reduction reactor and to discharge it at the highest feasible temperature, normally in the range of 400° to 750° C., in order to decrease energy cost in the electric furnaces where DRI is melted, or alternatively to hot briquet the DRI, commonly at temperatures above 600° C. This represents substantial energy savings. However, transportation of DRI at high temperature has so far involved using systems which have significant drawbacks.

U.S. Pat. Nos. 3,799,367 and 4,188,022 teach discharging DRI at a high temperature from a direct reduction reactor without cooling it down to ambient temperature. It is proposed to transport this hot DRI to its next processing step, utilizing containers which are placed at the outlets of the discharge bins of the reduction reactor. These containers are filled with an inert gas to prevent contact of hot DRI with oxygen in the air, thus avoiding reoxidation thereof. This transport system, however, presents a number of disadvantages, because the containers with DRI must be moved through the plant by means of trucks or railroad equipment. This requires a maintenance system for motorized vehicles with its consequent high operating costs.

Furthermore, such a system also needs transit space within the plants. In an already existing plant, it is very difficult to open suitable space for transit of trucks or a railroad, if such installations are not planned beforehand.

As previously discussed, it has been also proposed in the past to form the DRI particles into briquettes while at high temperature whereby compaction of DRI particles into dense briquettes decreases substantially the porosity and thereby its reactivity. However, even if only for hot DRI transport to the briquetting press, systems currently in use are complicated and involve large investment and high operating costs.

German patent No. 3806861 teaches transport of hot DRI in a bin. Such bins are used with pressure locks in some direct reduction processes operating at pressures over one atmosphere. These processes require pressure locks for charge and discharge of the reduction reactor. This transport system is however applicable only to short distances, for example from the reduction reactor to a briquetting press located close to said reactor. If DRI is to be transported over longer distances, for example hundreds of meters, this system using pressure lock bins is not practical nor economical since it would require a larger number of such bins, which, due to their required characteristics for pressure, temperature and abrasion resistance as well as their sealing valves, are expensive.

By far the most common current practice for DRI transportation involves discharge from the reactor at low temperatures, for example at temperatures below 100° C., and utilization of open belt conveyors. DRI is moved by means of these belt conveyors, to silos or storage bins and then to feeding bins of the electric furnaces at the meltshop. This method, however, has several drawbacks. For example, the fines, e.g. the very small particles produced from the abrasion and breakage of ore lumps, of pellets, or of DRI inside the reduction reactor and during DRI handling, are spilled at transfer points and are entrained by ambient air currents passing over the open conveyors with the consequent problems of losses of valuable metallic iron units and of significant environmental pollution. These losses of metallic iron, which mainly occur at the transfer stations of the DRI, can be as 2% to 10% of DRI production, depending on the type of facilities.

Non-commercialized attempts to produce DRI by fluidized bed direct reduction methods have been proposed from time-to-time. These teach the use of very fine-grained ores up to only 3 mm in diameter and preferably less than 0.5 mm). In dealing with a grain size appropriate to being fluidized, a few such references have suggested pneumatic transport of such "fine-grained sponge iron" (see U.S. Pat. Nos. 4,007,034 and 4,045,214). However, U.S. Pat. No. 4,412,858 is the only reference known to applicants which is relevant to the commercially-proven larger-sized DRI particles (i.e. greater than 0.5 cm) that has any suggestion of pneumatic transport of DRI. Yet, even this latter patent's teaching is only in the context of the larger "sponge iron pellets [being]... converted to finely divided form" by "grinding or milling" prior to transport by a carrier gas.

Crushed limestone is reported to have been pneumatically transported over short distances as a feed device; however, this is a relatively soft material as compare to DRI (or even to iron ore). Thus, in spite of such uses, such lime transport has never been extended to or suggested for iron ore or for DRI of a size greater than 3 mm.

There is also considerable literature on pneumatic transport of catalyst particles in the petroleum industry, but always of smaller particles of a size appropriate for use in a fluidized bed.

OBJECTS AND SUMMARY OF THE INVENTION

It is an object of the present invention to provide a method for the production of iron and steel employing a system for transportation of commercial-size DRI at high and low temperatures, which is economically applicable to short and long distances, which increases the productivity of a steelmaking plant by avoiding losses of DRI fines and of reoxidation, and which minimizes the problem of environmental pollution caused by said fines.

Other objects and advantages of the invention will be evident to those skilled in the art or will be described in this specification of the invention and appended drawings.

According to the present invention, the objects thereof are achieved by means of a method for the production of iron and steel wherein DRI of a size largely over 0.5 cm is pneumatically transported. This preferably comprises producing said DRI in at least one direct reduction reactor and transporting such DRI pneumatically by means of a carrier gas caused to flow through a duct extending from a first point (at the discharge into said duct of said DRI from said reduction reactor) to a second point (of remote use or storage of the DRI). Said gas stream may have a variety of chemical compositions. For example air, natural gas, synthesis gas or reducing gas of the same type used for DRI production may be utilized. Pneumatic transport of DRI is preferably carried out at a carrier gas velocity in the range of 9 to 35 m/sec., at a pressure of between 1 and 5 kg/cm$^2$, and ratio of mass of DRI to mass of carrier gas between 7 and 25. Preferably, the gas stream is air which has been contained and recirculated.

The problems and drawbacks of cold and hot transportation of commercial DRI in steelmaking plants, have not heretofore been satisfactorily solved. The present invention effectively minimizes these problems to great advantage, by surprisingly teaching contrary to conventional wisdom the use of pneumatic transport of DRI of a size mainly in excess of 0.5 cm in steelmaking plants, while modifying the transport operating conditions to achieve offsetting advantages of minimized reoxidation, minimized heat loss, containment against air and ground pollution, and less handling and storage requirements (thus resulting in less overall maintenance and space requirements for handling), all unexpectedly without excessive abrasion of the transport equipment and fractionation of the DRI.

Normally pneumatic transport has been applied to convey very small particles, e.g. powders. In the very rare applications of pneumatic transport of high density particles having a size larger than 1 cm, such installations have not operated at a continuous rate due to the rapid and substantial deterioration of the ducts caused by the impacts of said particles. The present invention minimizes this problem by the particular velocity range at which it operates and renders possible its industrial application.

One of the problems presented by the application of pneumatic transport of DRI, is fines formation which is caused by the strong collision of particles against the pipe wall, principally at direction changes. This is surprisingly minimized by the counter-intuitive use of right angle T-junctions that collect stationary particles in the corners of the angle to result in a naturally smooth transition curve, to cushion the impact of the particles relative to the pipe walls to protect both the particles from breakage and the pipe at the angle from abrasion.

Fines from breakage lower the overall yield of the steelmaking process because their light weight causes them to be entrained in the gases that exit the electric furnaces. The present invention, however, minimizes this problem due to its particular operating conditions.

The known reactivity of DRI with air in the past ruled out the use of air as carrier gas. However, according to one of the particularly preferred embodiments of the present invention, the air is surprisingly effectively used by being contained and continuously recirculated within the transport duct such that under steady state operation the comparatively small amount of oxygen initially in the air circulating in the duct reacts with DRI and through its recirculation the gas remaining in the transport duct soon becomes largely composed of nitrogen, all unexpectedly without any significant effect on the quality of the net amount of transported DRI (in spite of the initial presence of oxygen). This represents a great economic advantage, because it is not necessary to produce or buy separately an inert gas nor use a costly and potentially hazardous reducing gas as a protective carrier gas for transport purposes.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
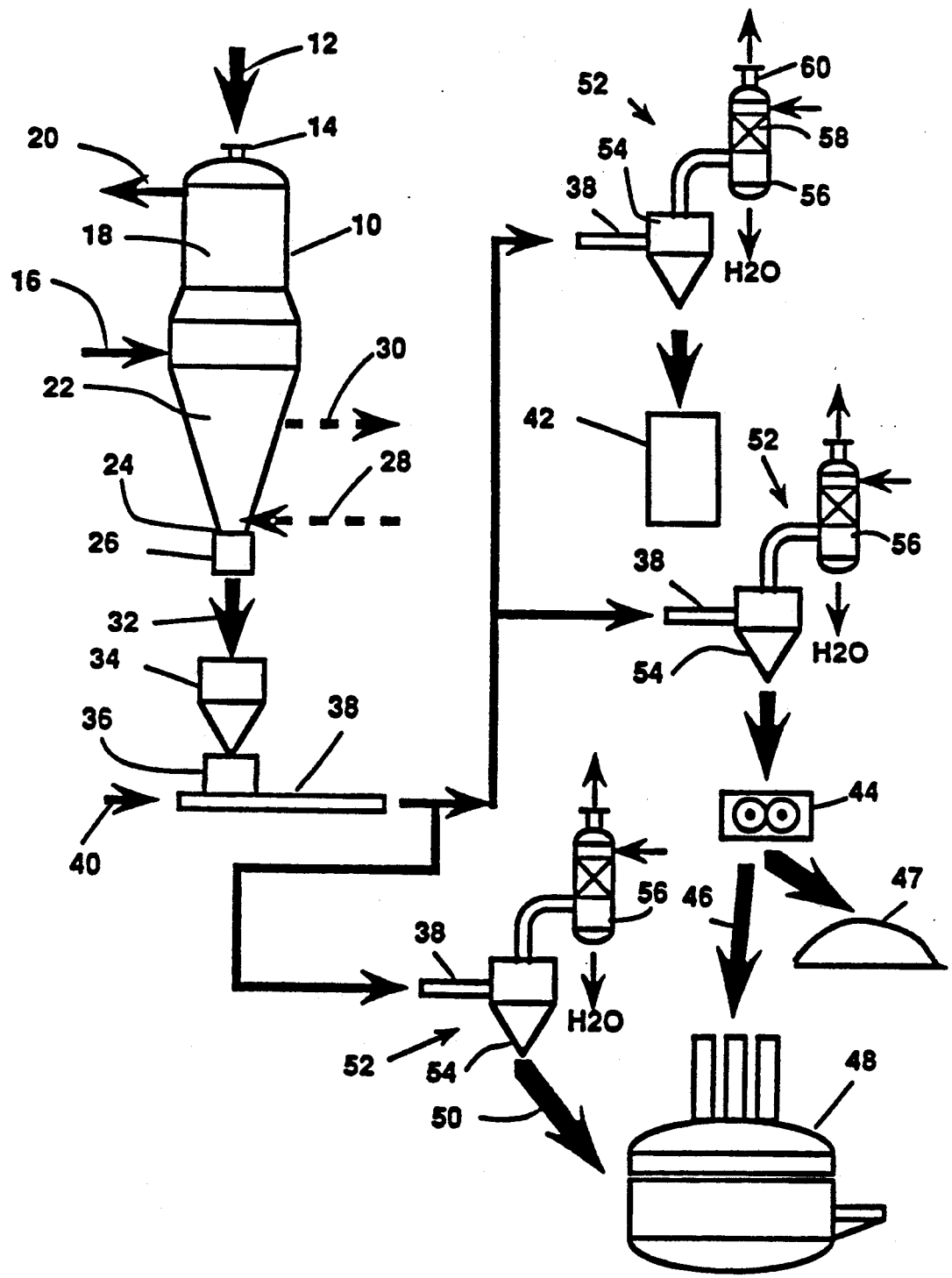
FIG. 1 shows schematically a steelmaking plant illustrating a preferred embodiment wherein DRI is pneumatically transported from the reduction reactor to one or more points of processing said DRI, which are alternatively and/or sequentially illustrated as being a briquetting press, an electric arc furnace in a meltshop, and a storage bin.

With reference to FIG. 1, numeral 10 generally designates a direct reduction reactor to which iron ore 12 is fed in form of lumps, pellets or mixtures thereof, through at least one inlet 14. The iron ore descends through the reactor 10 and is countercurrently contacted with a reducing gas at high temperature, normally in the range of 850° to 950° C., which reducing gas is introduced to the reactor at point 16 located in the lower part of the reduction zone 18, and is removed from the reactor at point 20 located in the upper part of said reduction zone, in a manner already known in the art.

At the lower part of reactor 10 there is a conical section 22 which converges to at least one outlet 24 through which the already reduced ore or DRI is discharged. In many plants this lower zone 22 is used as cooling zone for DRI, in order to cool it down to ambient temperature for handling without reoxidation problems when in contact with the atmosphere. In order to cool down DRI, normally a cooling gas stream is circulated countercurrently to the DRI, which gas is introduced at the lower part thereof, as indicated by numeral 28 and is removed hot at the upper part thereof as indicated by numeral 30. Both the reducing gas and the cooling gas are recycled to the reactor as it is well known in the art. When it is desired to discharge the DRI at high temperature, the cooling gas loop is not used and DRI is discharged hot.

DRI is discharged from the reduction reactor at a rate regulated by a device 26 which may be a rotary or star valve, for example as described in U.S. Pat. Nos. 4,427,135 and 4,427,136, or may be other devices of the type described in U.S. Pat. Nos. 3,375,099; 2,670,946; 4,129,289 and 4,032,120.

DRI 32 is passed to a discharge accumulation bin 34 wherefrom it is introduced at a regulated rate into duct 38 by means of a device 36, which may be a rotary valve (also called a star feeder), a screw type feeder, or a vibratory feeder.

A gas stream 40 is caused to circulate through duct 38 to entrain and pneumatically convey the DRI to a remote point illustrated for example as (1) a storage bin or silo 42, (2) a briquetting press 44 (where briquettes 46 of DRI are formed), and/or (3) an electric arc furnace 48. With the advantages already mentioned above, the briquettes 46 from the press 44 may be charged to a metallurgical furnace, here illustrated as an electric arc furnace 48, or to a different type of furnace where metallic iron is melted and refined, such as induction furnaces, basic oxygen furnaces (BOF), melter-gasifiers, etc., or just to a temporary storage pile 47.

In one of the preferred alternatives, the DRI may be transported and directly charged into the electric arc furnace as indicated by arrow 50.

Each one of the illustrated alternatives of FIG. 1 is provided with a receiving station 52 for DRI, comprising a receiving bin 54 which may be used to disengage the carrier gas and the solid particles by a simple expansion of the flow area. Disengagement of the particles from the carrier gas is aided by an enlargement of the pipe 38 close to its introduction into the bin 54 (thus reducing the flow velocity).

Carrier gas exits the receiving bin 54 and passes to a cleaning and cooling tower 56, where said gas is contacted with water in a packed bed 58, in a manner known in the art. The gas cleaned and at, or relatively near, ambient temperature exits the tower 56 through outlet 60.

Figure 2:
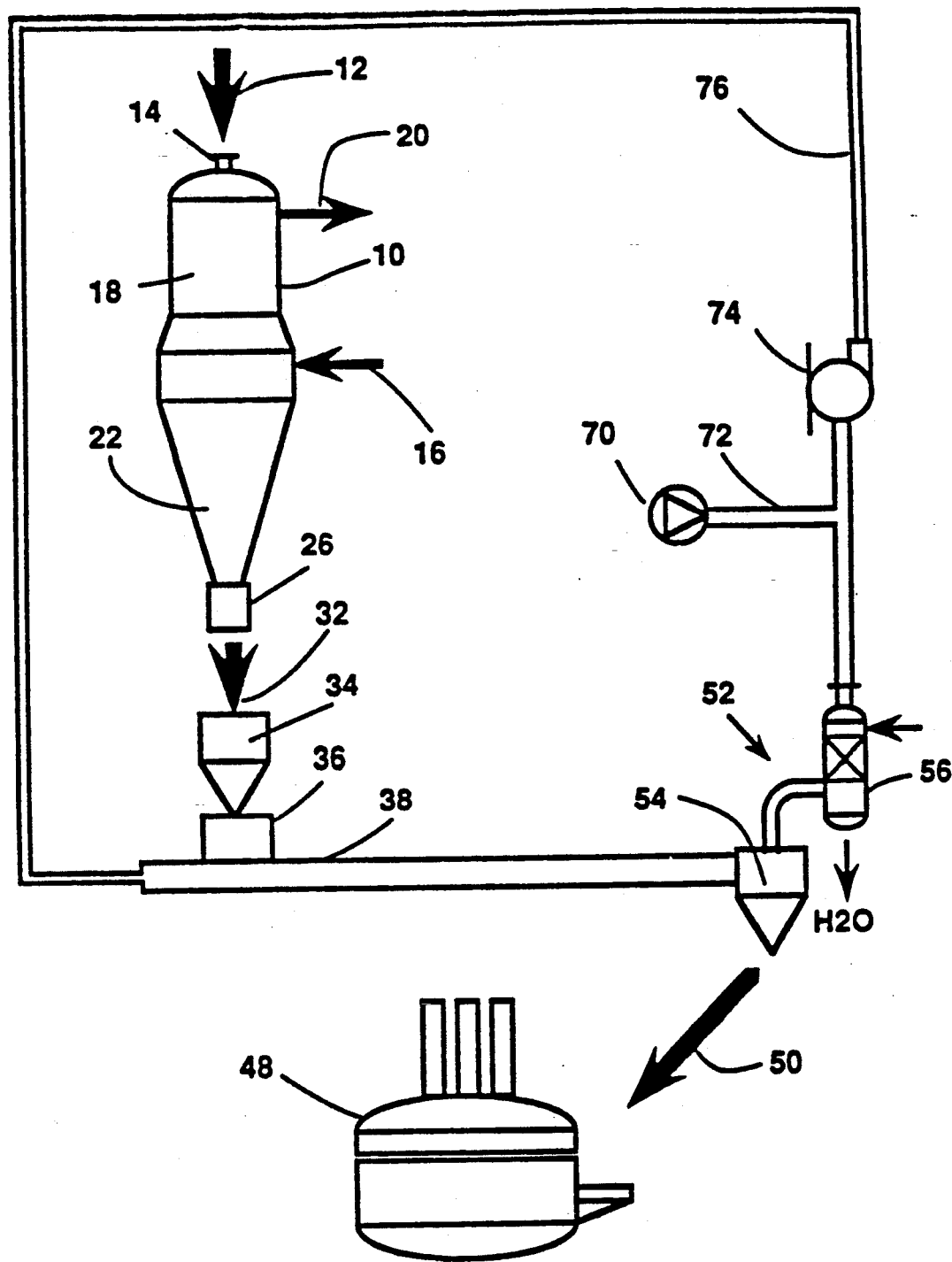
FIG. 2 shows a more particularly preferred embodiment of the invention for the pneumatic transport of DRI wherein the carrier gas utilized advantageously is air which is continuously recycled in an endless loop back through the transport duct.

In FIG. 2, those elements which are the same have been designated with the same numerals as in FIG. 1. FIG. 2 shows a particularly preferred embodiment where air is used as the carrier gas which is recycled to great advantage. The oxygen of the initial charge of air as the carrier gas in the transport and recycle ducts (38 and 76) reacts with DRI and, when recycled, the resulting carrier gas composition very soon stabilizes to almost pure nitrogen. This characteristic makes the operation of the pneumatic transport very economical. A stream of air is supplied as an initial charge (and thereafter only as a make-up in small amounts) from a suitable source 70 through duct 72 and is caused to circulate in a closed circuit by compressor 74 through return duct 76 and transport duct 38 in order to convey DRI introduced to duct 38 by means of a feeder or dosifier device 36.

DRI 50, transported from the accumulation/discharge bin 34 to the receiving/separation station 52, is then utilized in the electric arc furnace 48 to be melted and refined in said furnace 48 to produce the desired steel.

Thus, even though the utilization of air would seem to be counterindicated due to DRI reactivity with air, especially at the high temperatures existing with the preferred transport of hot DRI; nevertheless, by recycling the carrier air its relatively small finite oxygen content is soon consumed, resulting in a carrier gas which is almost pure nitrogen. Recycling can be accomplished at relatively high temperatures, even with the scrubbing and partial cooling in tower 56 (needed to protect the compressor 74), thus minimizing yet another source of heat loss. Furthermore, the heat content of the separated still-hot recycle carrier gas is relatively small, because among other things at high temperatures a given mass of gas has a larger volume so less gas is needed to transport a given mass of DRI. Furthermore, the work of the compressor tends to reheat the recycle gas too.

Figure 3:
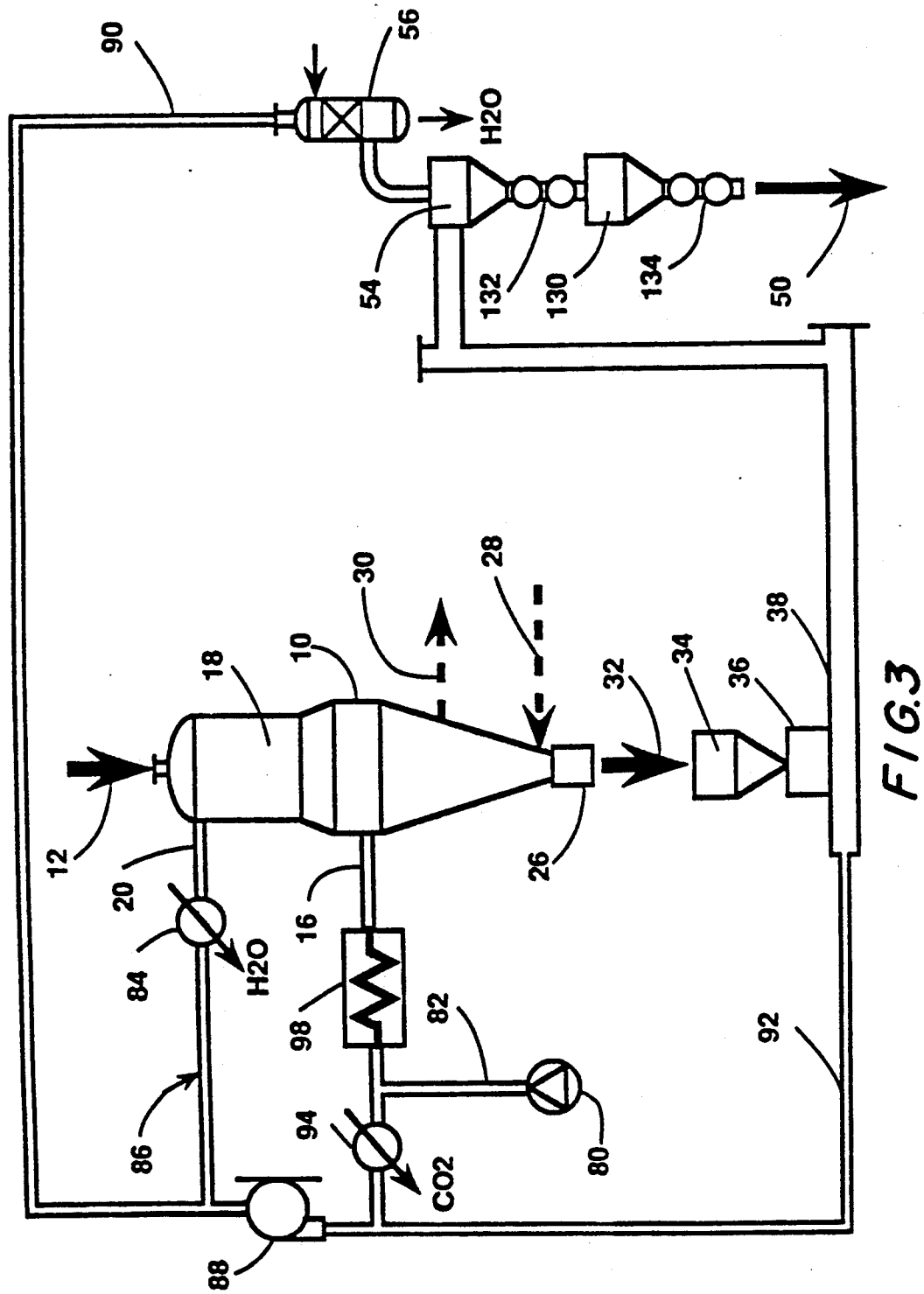
FIG. 3 shows a modified preferred embodiment of the invention wherein the carrier gas is the same as the reducing gas used for producing the DRI.

In the alternative embodiment of FIG. 3, a reducing gas from a source 80, for example produced by the catalytic reformation of natural gas with steam, is introduced through duct 82 into the reduction circuit 86 comprising the reduction zone 18 of reactor 10, a gas cooler 84, a compressor 88, a $CO_2$ absorber 94 and a gas heater 98. A portion of the reducing gas leaving compressor 88 is led through duct 92 to duct 38 to be utilized as the carrier gas for DRI introduced from the feeder 36. The reducing gas, after having been separated from DRI at bin 54, is cooled and cleaned in gas cooler 56 and is recycled to compressor 88 via duct 90.

DRI is introduced from bin 34 to duct 38 through a regulating device 36, and, after gas separation in bin 54, passes to lockhopper 130 which is provided with sealing valves 132 and 134 to discharge the DRI from the transport system without contact of the reducing gas with the atmosphere. See U.S. Pat. Nos. 3,710,808 and 4,498,498 for such valve systems.

Figure 4:
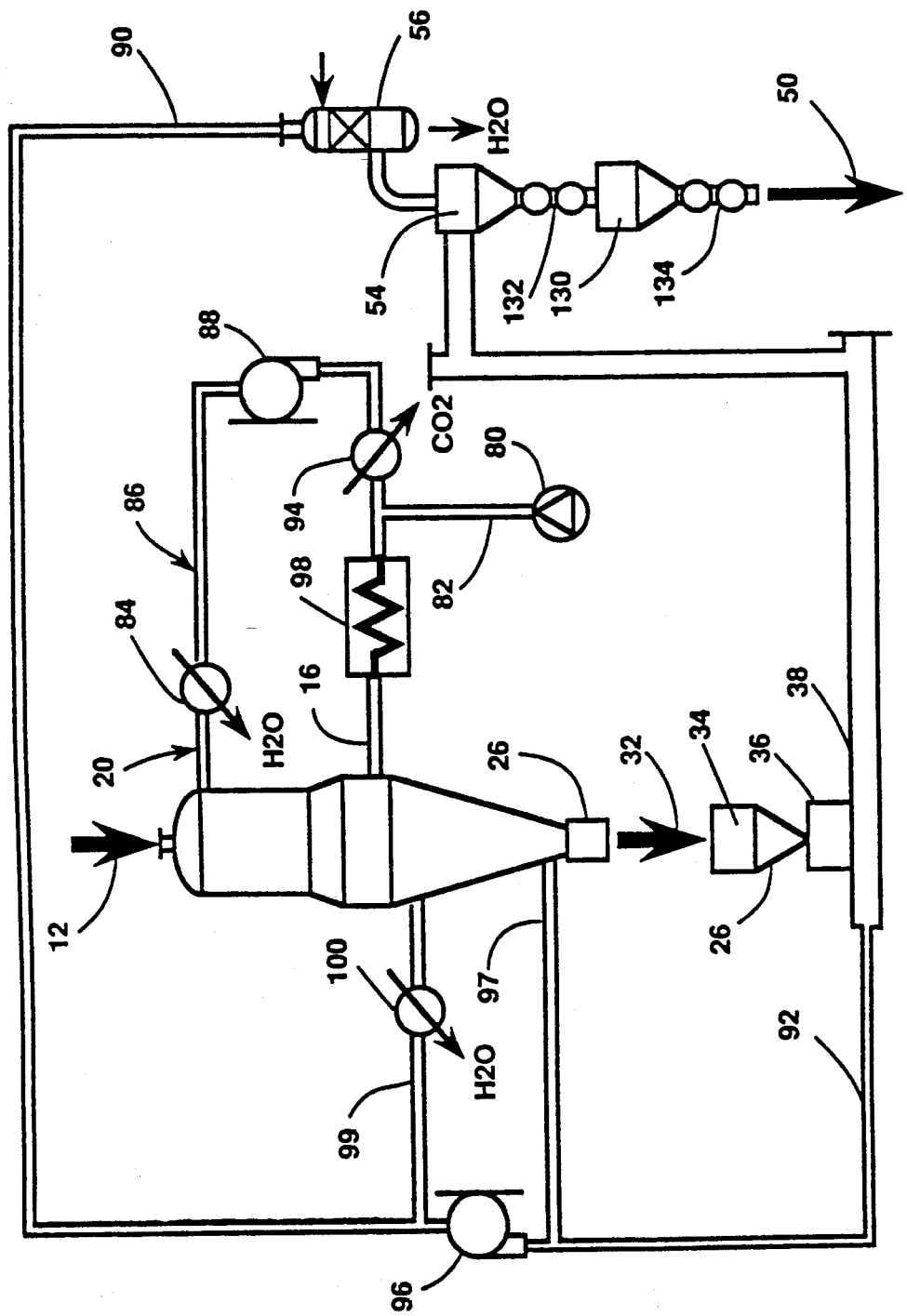
FIG. 4 shows another modified embodiment of the invention wherein the carrier gas is the same gas as that used for DRI cooling.

FIG. 4 shows another embodiment of the invention wherein the carrier gas is a portion of the cooling gas utilized in the lower part of the reduction reactor, which normally is also a reducing gas or natural gas. More particularly, a portion of the cooling gas circulating through a circuit comprising the cooling zone of the reactor, a gas cooler 100, a duct 99, and a compressor 96, is introduced into duct 38 by means of duct 92 to be utilized as carrier gas for the DRI. Operation of the other components of the system is the same as described with reference to the previous figures.

Figure 5:
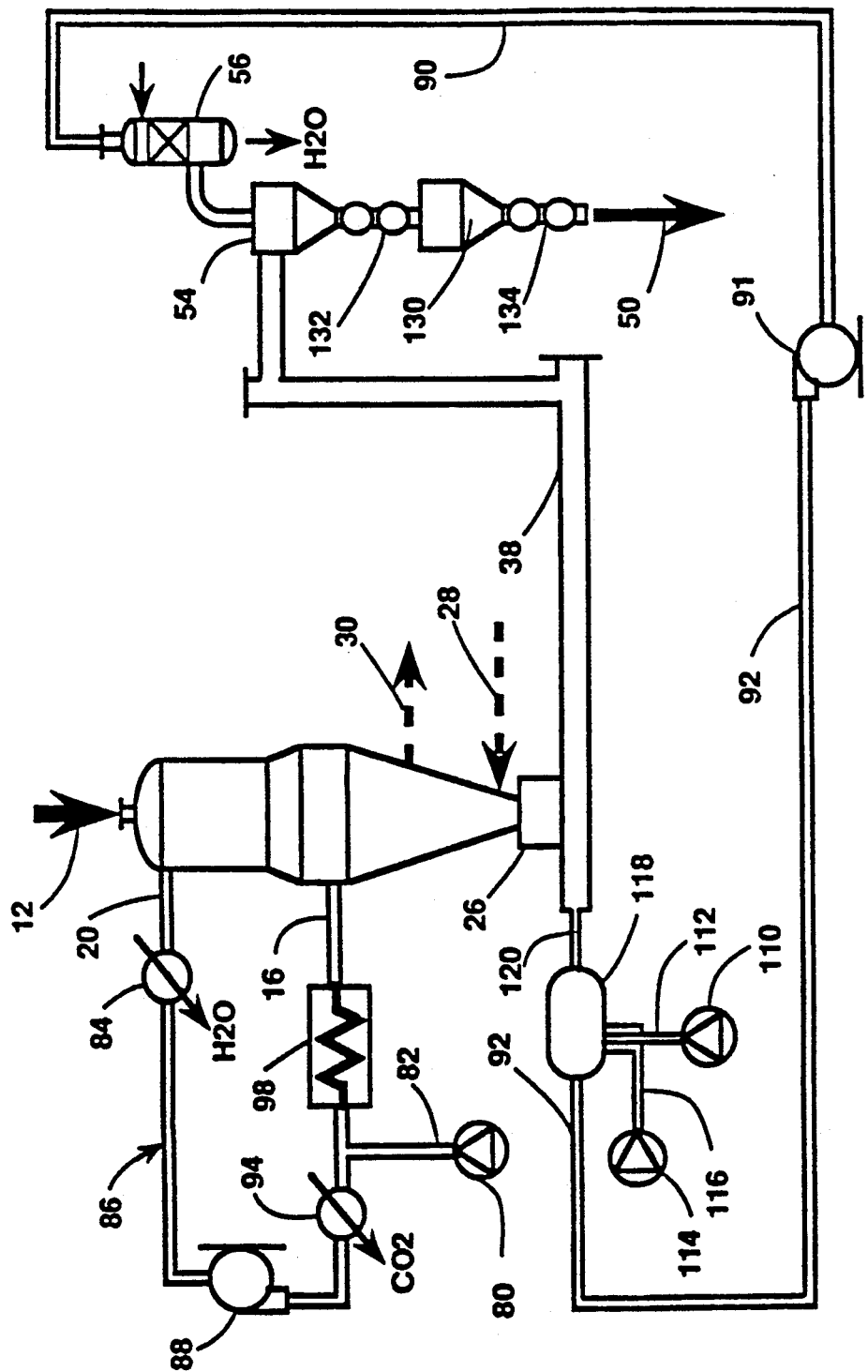
FIG. 5 shows an embodiment of the invention similar to FIG. 2, wherein DRI is introduced to the pneumatic transport duct directly from the device which regulates the rate of ore processing in the reduction reactor, and the carrier gas is combusted natural gas.

FIG. 5 shows another embodiment on the invention wherein the carrier gas is generated through the combustion of natural gas, or of any other suitable fuel, with air. A stream of natural gas from a suitable source 110 is introduced through duct 112 into gas generator 118 where it undergoes combustion with air from a source 114 which is introduced into generator 118 through duct 116.

Combustion in generator 118 consumes the oxygen in the air, forming a carrier gas largely composed of nitrogen and carbon dioxide. This carrier gas is injected via duct 120 into the transport duct 38. Optionally, the carrier gas discharged from scrubber 56 is recycled to the gas generator 118 or directly to the injector duct 120, thus decreasing the consumption of air and make-up fuel.

Figure 6:
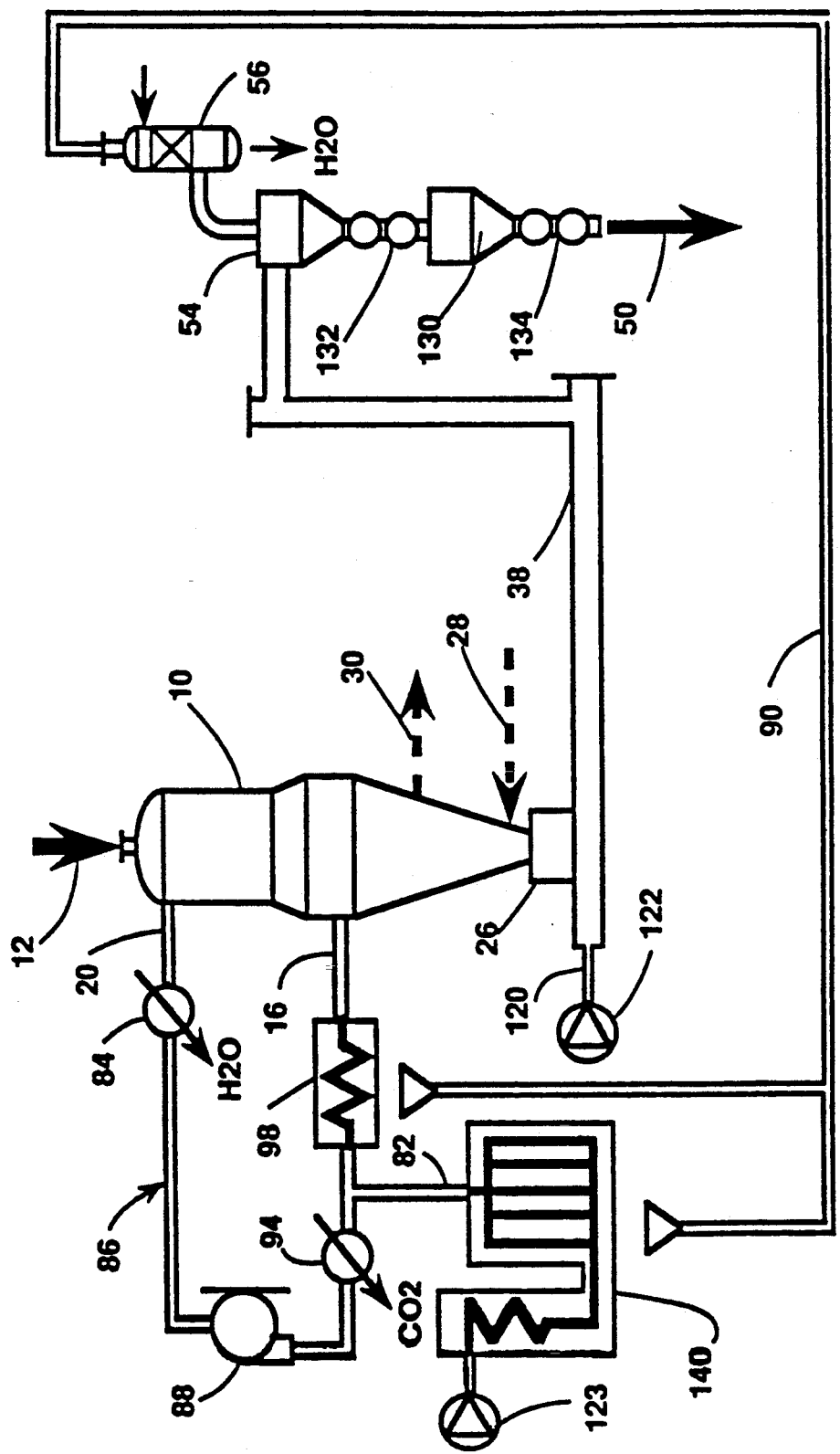
FIG. 6 shows still another modified preferred embodiment of the invention wherein the carrier gas in the DRI pneumatic transport is natural gas, which, after it is used in said DRI transportation, is shown fed to burners for a heater and a steam reformer (being normally still too dirty for use as a feed to the catalytic reformer).

FIG. 6 shows another embodiment of the invention wherein the carrier gas utilized for pneumatic transport is natural gas which is fed, from a suitable source 122 available at a high pressure, to duct 38 through supply duct 120. A regulating and dosifying device 26, which removes DRI at a controlled rate from the reduction reactor, feeds DRI directly to duct 38 to be transported therein (thus omitting the intermediate accumulation bin 34 and discharge device 36). This omission of bin 34 and discharge device 36 can be made in the embodiments in the other Figures also. Dosifying device 26 may be a rotary valve or star feeder, or a device of the type of a screw or vibratory, as it has been described here with reference to the previous figures.

Natural gas, once separated from DRI at bin 54, is cleaned in tower 56 and is fed to the burners for the heater 98 and the reformer 140 through return pipe 90. In reformer 140, natural gas is caused to react with steam which are fed to said reformer from a source 123 in a manner known in the art. The reducing gas produced in the reformer 140 is injected into the reducing gas loop 86 through pipe 82 in order to produce the DRI in reactor 10. In accordance with U.S. Pat. No. 4,528,030, issued Jul. 9, 1985, the external reformer with its sensitive catalyst tubes can be omitted and the natural gas and steam from source 123 (or possibly even 90) can feed directly into the reduction circuit 86.

EXAMPLE 1

Thirty six (36) tons of DRI at high temperature were pneumatically transported in a pilot plant from a discharge bin through successive runs of 4" diameter pipe joined by T-junctions, which runs were 2 meters horizontally, 6 m vertically, 71 m. horizontally, and 1 m vertically, followed by a horizontal right angle turn and then further runs of 13 m horizontally, 13 m vertically, and then finally into a 11 m vertical pipe of 6" diameter.

Operation conditions were:

| | |
|---|---|
| Gas | air |
| Pressure at inlet | 1.8 kg/cm² man. |
| Flow rate | 80 lbmol/hr |
| Temperature | 30 degrees Centigrade |
| Gas Velocity at inlet | 20 meters/second |
| Solid Material | DRI pellets |
| Temperature | 650 degrees C. |
| Rate of transport | 20 tons/hr. |

| | SCREEN ANALYSIS | |
|---|---|---|
| | Initial | Final |
| Size (inches) | Weight Fraction (%) | Weight Fraction (%) |
| ½ | 30 | 14 |
| ⅜ | 32 | 27 |
| ¼ | 18 | 27 |
| ⅛ | 13 | 23 |
| <⅛ | 7 | 9 |

The following data were taken at the outlet point:

| | |
|---|---|
| Temperature | 550 Degrees Centigrade |
| Pressure Drop | 1.8 Kg/cm² |
| Pressure | Atmospheric |
| Power | 5 Kilowatts/ton |
| Solids/Gas ratio (mass) | 19 |

EXAMPLE 2

The experiment of Example 1 was repeated, but with the 36 tons of DRI being instead at ambient temperature.
Operating conditions were:

| | |
|---|---|
| Gas | air |
| Pressure at inlet | 1.97 kg/cm² man. |
| Flow rate | 165 lbmol/hr |
| Temperature | 30 degrees Centigrade |
| Gas Velocity at inlet | 20 m/s |
| Solid Material | DRI pellets |
| Temperature | 35 degrees Centigrade |
| Rate of transport | 20 tons/hr. |

| | SCREEN ANALYSIS | |
|---|---|---|
| | Initial | Final |
| Size (inches) | Weight Fraction (%) | Weight Fraction (%) |
| ½ | 61 | 25 |
| ⅜ | 28 | 51 |
| ¼ | 8 | 16 |
| ⅛ | 3 | 7 |
| <⅛ | 0 | 1 |

The following data were taken at the outlet point:

| | |
|---|---|
| Temperature | 550 degrees Centigrade |
| Pressure Drop | 1.8 Kg/cm² |
| Pressure | Atmospheric |
| Power | 10 Kw/ton |
| Solids/Gas ratio (mass) | 15 |

If "fines" are defined as being anything less than ⅛", then the pneumatic transport of friable DRI increased the fines content surprisingly by about only 1 or 2%.

Note that because of the greater weight of the air under ambient temperature conditions in Examine 2 as compared to Example 1, twice as much power was needed to transport cold DRI than was needed for the same amount of hot DRI.

The experimental apparatus can empty about 36 tons of DRI in about 45 minutes and has transported DRI over 200 meters.

The types of carrier gas herein described, may be employed in the embodiments discharging cold DRI as well as in embodiments discharging hot DRI. DRI may be introduced into the transport duct with or without an intermediate discharge bin.

As a practical matter, economically and otherwise, the upper limits of the particle size to be transported should be about three inches (and preferably no more than ⅓ the diameter of the transport pipe). Normally the DRI pellets mainly are from greater than ⅛" to ¾", and DRI lumps range up to 1" to 1¼. The practical length of pneumatic transport is under 2000 m, most typically about 200 to 300 meters. Thus typical pneumatic transport in an experimental plant from the reduction reactor to the EAF is less than a minute through a 4" to 6" progressively increasingly sized pipe. This gives minimal time for heat loss during transport. The energy loses in pneumatic transport of DRI (mainly electric cost for the compressor) are more than made up for in the savings in time, energy, and retained fines.

Relatively lower gas velocities are preferred so as to minimize abrasion and congestion, but with sufficient velocity for efficiency of transport. For example, for a 4" pipe 164 meters long, the transport of typical DRI from a moving bed reactor generated a bell curve when the capacity of DRI conveyed was plotted against gas velocity (from about 11 metric tons of DRI/hour at a velocity of 9 meters/second, to about 23 m tons/hr. at 20 m/s, and back down to 11 m tons/hr. at 35 m/s); thus indicating a preferred range of about 17 to 25 m/s velocity of the carrier gas.

What is claimed is:

1. The method of transporting hot sponge iron particles, of a size at least 80% of which are greater than 0.5 cm and at least 50% of which are greater than 1.0 cm and which are produced by the direct reduction of particulate iron ore in a reduction reactor, from a departure point at the discharge of said reactor to a remote point of sponge storage or use, which comprises entraining said sponge iron particles in a carrier fluid, causing the mixture of carrier fluid and sponge iron particles to flow through a closed conduit to carry said particles by means of said carrier fluid to said remote point, and separating said carrier fluid from said particles at said remote point.

2. The method of claim 1, further comprising causing the mixture of carrier fluid and sponge iron particles to flow upwardly through a portion of said closed conduit which is at an elevation greater than said departure point.

3. The method of claim 2, further comprising recycling said carrier fluid to said reactor.

4. The method of claim 1, wherein said departure point is below said remote point and said two points are separated by a distance on the order of at least 86 meters.

5. The method of claim 1, wherein said carrier fluid is air.

6. The method of claim 3, wherein said carrier fluid originated as air.

7. The method of claim 3, wherein said carrier fluid is spent reducing gas from said reactor.

8. The method of claim 3, wherein said carrier fluid is spent cooling gas from said reactor.

9. The method of claim 3, wherein said carrier fluid is natural gas.

10. The method of claim 6, wherein the sponge iron particles are discharged from said reactor and conveyed to said remote point at a temperature between 450° C. to 700° C.

11. The method of claim 10, wherein said separated carrier fluid is cooled and is recycled back to said point at the discharge of the reactor.

12. The method of claim 11, wherein the hot iron particles arriving at said remote point are fed to an electric arc furnace.

13. Method of producing iron and steel by a process wherein iron oxides bearing particles are chemically reduced to DRI, solid particles of metallic iron and gangue of a size at least 90% of which is greater than 0.5 cm, by means of a direct reduction process in a reduction reactor, located at a first point in a steelmaking plant, where said DRI is discharged from said reduction reactor and is then transported to a continuing processing step at a second point in said plant, comprising pneumatically transporting said DRI through a duct from said first point to said second point utilizing a stream of carrier gas which is circulated through said duct at a velocity between 9 and 35 meters/sec.

14. Method of claim 13, further comprising discharging said DRI at a temperature between 450° C. and 950° C., and circulating said carrier gas through said duct at a pressure between 1 and 5 l kg/cm² gage and at a ratio of mass of DRI to mass of carrier gas in the range of 7 to 25.

15. Method of claim 13, further comprising melting and transforming to steel said DRI in a metallurgical furnace at said second point.

16. Method of claim 14, further comprising melting and transforming to steel said DRI in an, electric arc furnace.

17. Method of claim 14, further comprising discharging said DRI reduction reactor at a temperature above 600° C. and transforming the DRI to briquettes at said second point.

18. Method of claim 14, further comprising diverting the DRI into a storage site at said second point.

19. Method of claim 14, further comprising utilizing air as the source of said carrier gas.

20. Method of claim 14, further comprising utilizing nitrogen as said carrier gas.

21. Method of claim 14, further comprising utilizing natural gas as said carrier gas.

22. Method of claim 13, further comprising utilizing as carrier gas a portion of the reducing gas employed to produce said DRI in the reduction reactor.

23. Method of claim 13, further comprising producing said carrier gas by means of the combustion of a fuel with air.

24. Method of claim 14, further comprising transporting said DRI at a temperature above 400° C.

25. Method of claim 19, further comprising transporting said DRI at a temperature above 400° C.

26. Method of claim 14, further comprising cooling said DRI to ambient temperature within the reduction reactor and by utilizing as carrier gas a portion of the gas used to cool said DRI.

27. Method of claim 25, further comprising cleaning and recycling back through said duct at least a portion of said carrier gas, after having been utilized for pneumatically transporting said DRI.

28. Method of claim 27, further comprising producing said DRI in a moving bed reduction reactor.

29. Method of claim 14, further comprising producing said DRI in a fixed bed reduction reactor.

30. Method of claim 28, further comprising introducing said DRI to said duct through a pressure lock which permits discharging the reduction reactor without contact of atmospheric air with the inner part of said reactor.

31. Method of claim 28, further comprising introducing at a regulated rate said DRI into said duct directly from said reduction reactor.

32. The method of claim 13, wherein said carrier fluid is natural gas which after separation is returned from said remote point for use as fuel in said direct reduction process.

33. The method of transporting iron-bearing particles which may include iron ore or sponge iron, which are of a size at least 80% of which are greater than 0.5 cm and at least 50% of which are greater than 1.0 cm, from a departure point of use or storage to a remote point of storage or use, which comprises entraining said iron-bearing particles in a gaseous carrier fluid, causing the mixture of carrier fluid and iron-bearing particles to flow through a closed conduit to transport said particles to said remote point, and separating said carrier fluid from said particles at said remote point.

34. The method of claim 33, further comprising at said remote point delivering for further processing said particles separated from at least the bulk of said carrier fluid.

35. The method of claim 33, wherein said iron-bearing particles are iron ore.

36. The method of claim 33, further comprising causing the mixture of carrier fluid and iron-bearing particles to flow through an elevation higher than said departure point for at least a portion of the transport of said mixture through said closed conduit.

37. The method of claim 33, wherein the transportation of said iron-bearing particles is between one of said points and a reduction reactor for the production of sponge iron.

38. The method according to claim 37, wherein the transportation of iron-bearing particles further comprises transporting sponge iron from a departure point at the discharge of said reactor to a point remote from said reactor.

39. The method of claim 38, further comprising transport of iron ore particles from a departure point to an elevated remote point.

40. The method of claim 33, further comprising said carrier gas circulating through said closed conduit at a pressure between 1 and 5 kg/cm² gage and at the ratio of mass of particles to mass of carrier gas in the range of 7 to 25.

* * * * *